United States Patent [19]

Stucker et al.

[11] 4,272,766

[45] Jun. 9, 1981

[54] RADIO OPERATED REMOTE CONTROL

[75] Inventors: Wesley G. Stucker; Richard J. Coles, Jr., both of Houston, Tex.

[73] Assignees: Darlene M. Koch; Robert H. Koch, both of Alison Park, Pa.; Viola C. Coles, Houston, Tex.; Maurice Guy Reynolds, Houston, Tex.; Lydia M. Reynolds, Houston, Tex.; J. P. Carlson, Jr.; Carolyn Carlson, both of Pampa, Tex.

[21] Appl. No.: 10,418

[22] Filed: Feb. 8, 1979

[51] Int. Cl.[3] .................... B60Q 1/02

[52] U.S. Cl. .................... 340/696; 340/25

[58] Field of Search .................... 340/25, 694, 695, 696; 343/225, 228

[56] References Cited

U.S. PATENT DOCUMENTS

| | | | |
|---|---|---|---|
| 1,709,377 | 4/1929 | Sperry | 340/25 |
| 3,121,857 | 2/1964 | Lem et al. | 340/25 |

*Primary Examiner*—Alvin H. Waring
*Attorney, Agent, or Firm*—Ranseler O. Wyatt

[57] ABSTRACT

A radio operated remote control unit for attachment to a transmitter and having a second module attached to a transreceiver, which, through the use of a dual tone multi frequency signal, turns on the lights, or similar work, and maintains that status for a predetermined period of time. Also the electrical circuit employed to accomplish the said work.

2 Claims, 4 Drawing Figures

RADIO OPERATED REMOTE CONTROL

BACKGROUND OF THE INVENTION

Many private airplanes are being flown throughout the country, which are being housed in private hangers on small airfields, which close early at night. This presents a serious problem to planes seeking to land after dark. Arrangements must be made with the field to have personnel on duty after hours. Often delays occurs that make this impossible and gives rise to dangerous situations. It is an object of this invention to provide a means having one attachment on the aircraft and the other on the transceiver at the control tower of an airfield, which, when activated, turns on the lights at the field, even though the attendants are no longer there.

SUMMARY OF THE INVENTION

A device having two parts, one attached to the transmitting apparatus of an aircraft radio, and the other to the transceiver in the control tower of an airport, enabling the pilot of the aircraft, through a novel circuit transmitter attachment and in the transceiver attachment, to turn on the lights at the airport for a preselected period of time, enabling the pilot to land the plane unassisted by ground personnel.

DESCRIPTION OF THE PREFERRED EMBODIMENT

Figures 1, 4:
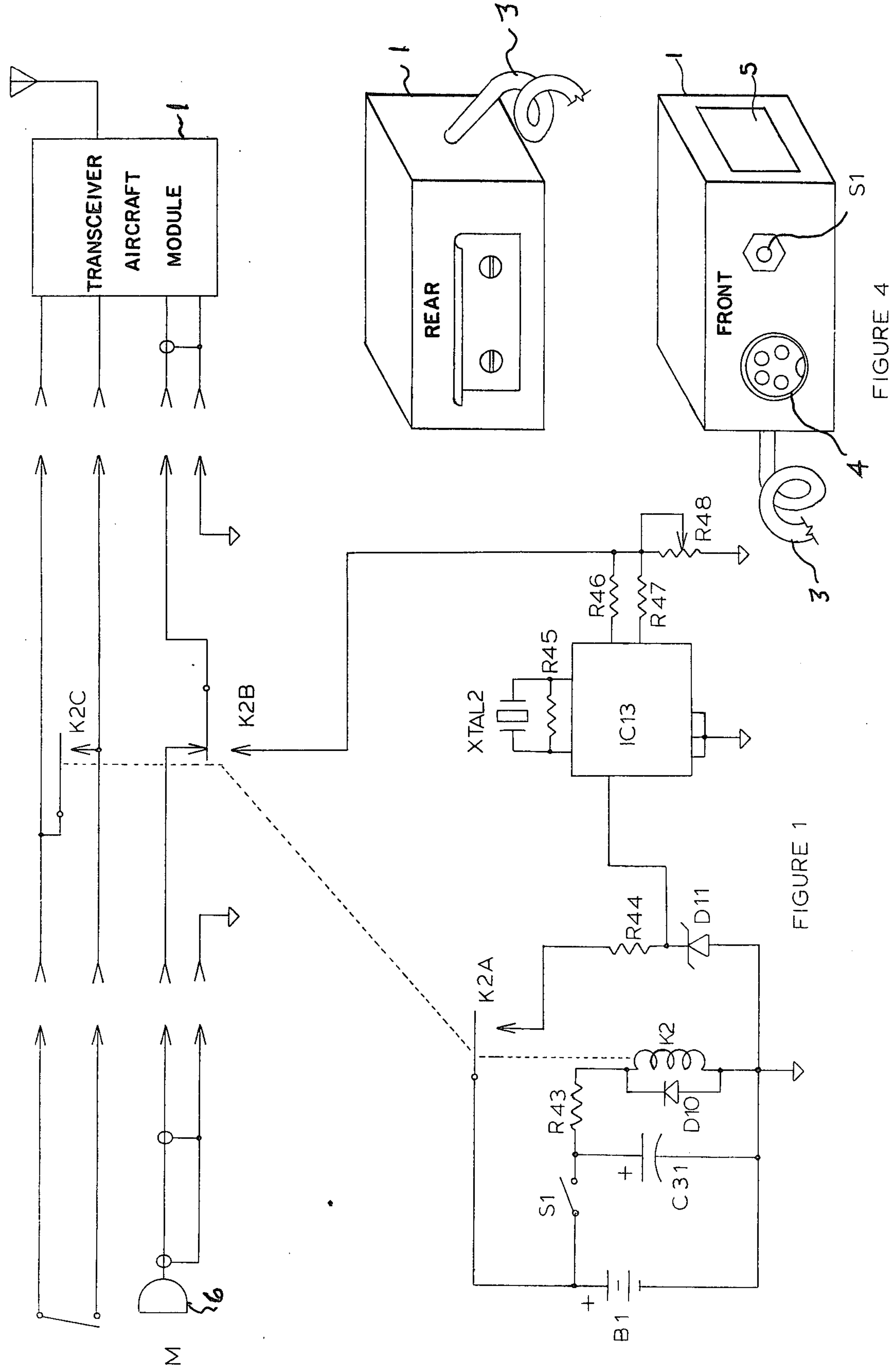
FIG. 1 is a diagrammatic sketch of the electrical circuits employed to accomplish the desired transmission and reception of a signal and the activation of the work.
FIG. 4 is an elevational view of the front and an elevational view of the rear of the aircraft module housing.
Figure 3:
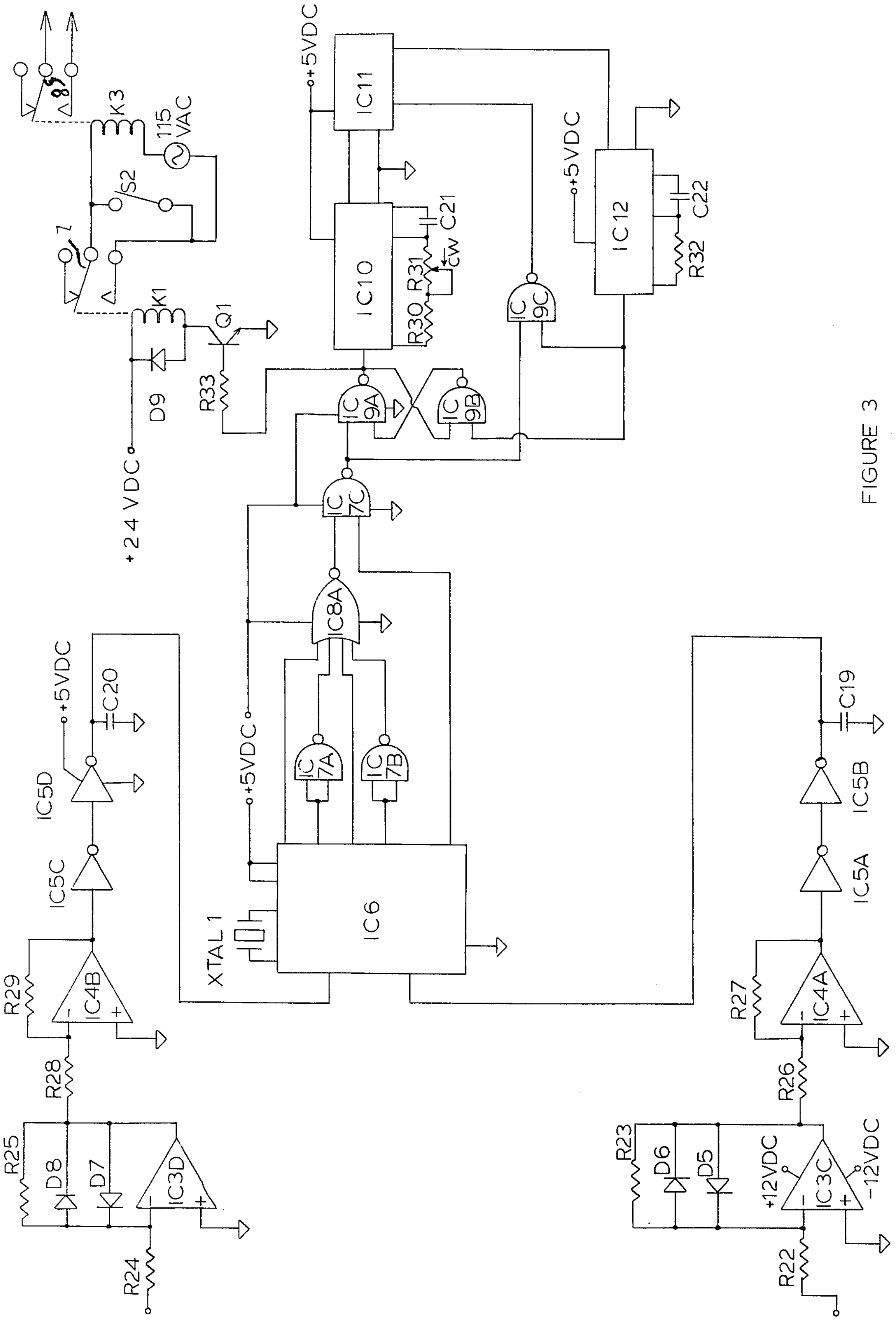
FIG. 3 is a continuation of the diagrammatic sketch from FIG. 2, illustrating the circuits employed in the receiver.
Figure 2:
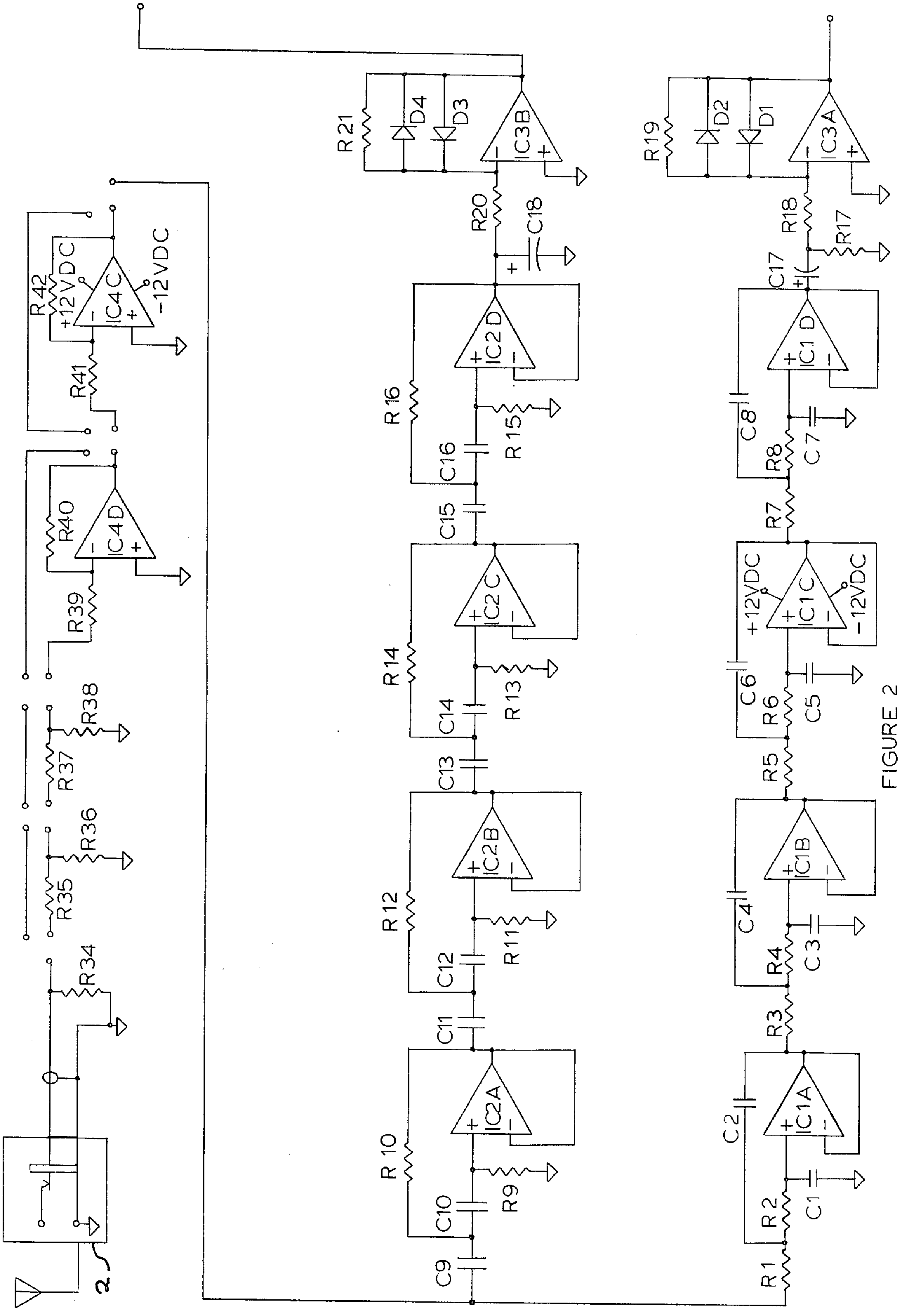
FIG. 2 is a diagrammatic sketch of the circuit employed in transmission of the signal.

The device is contained in two modules, the module 1 being located in the aircraft, where it is connected into the transmitter (not shown) through the conduit 3 and which has a socket to receive the microphone conduit 4. A battery is mounted in the module 1 and has the door 5 for access thereto formed in said module 1. A push button S1 closes the switch and energizes a relay K2, closing contact A and supplying voltage from the battery B1 to the resistor 44 and diode D11, which supplies the current voltage for the tone generator IcI3. The contact B is also closed, taking the input of the transmitter in the module 1 away from the microphone 6 and connects it into the output of ICI3. The exact output level is determined by R46, R47 and R48, which should be adjusted for approximately 90% modulation. The contacts C will be moved to closed position to transmit the tones to be generated. The capacitor C31 keeps the relays K2 energized for approximately one second, permitting the operator to merely press button S1, without having to hold it in pressed position.

An audio sample from the control tower receiver is fed initially to four stages of programable level adjustment. The first two stages, R35 through R38, both inclusive, are 6dB attenuators, and the second two, IC4C, IC4D and R39 through R42, both inclusive are 6dB amplifiers. Normally, these four stages will be by-passed by attaching jumping wires (not shown) to the appropriate terminals, however, should the output of the receiver be too great or too small, these stages can be used to adjust it.

The next stages are active filters formed by IC1 and IC2, whch are high pass and low pass, respectively, and their associated resistors R1 through R16 and capacitors C1 through C16. The output of these filters are sine waves which will be converted to square waves by IC3 and diodes D1 through D8. After squaring, the signals are amplified to TTL-compatible levels by IC4A and IC4B, then fed into IC5A through IC5D to further condition the signals for introduction to the decoder IC6. When the decoder IC6 detects a valid input signal, it provides the binary-coded digit (in this case, the number 5) and a strobe signal which verifies a valid input. When all is correct, the output of IC7C will change momentarily, about one second which sets a latch formed by IC9A and IC9B. The output of IC9A will go high, which causes transistor Q1 to conduct, and relay K1 to energize. The contacts 8, 9 of K1 activate the AC contactor K3 which actuates the switch 6,7 and turns on the lights. At the same time, the output of IC9A causes IC10 to oscillate at a rate determined by the potentiometer R31. IC11 is a frequency divider. After 16,384 cycles of oscillation of IC10, Ic11 signals IC12 which is a monostable multivibrator, which provides a pulse of approximately 600 microseconds. This pulse resets the latch IC9A and IC9B, and clear the counter IC11 through IC9C. When the latch resets, Q1 stops conducting and K1 relaxes, turning off the lights. Varying R31 will change the frequency of IC10 such that there will be ten to twenty minutes of light at each use. Now IC11 is ready for the next actuation. In the event that a second valid signal is detected before the lights go off, the pulse from IC7C which sets the latch is also fed through IC9C to IC11. In this way, IC10 continues to oscillate, but IC11 is forced to start counting from zero, thus giving the second pilot the same ten to twenty minutes of light without waiting for the lights to go off and without the danger of the lights going off when they are needed most.

A manual override switch S2 is provided for such occasions upon which continuous lighting is required. Said Switch S2, when manually actuated, will cause the lights to remain on until the switch is again opened.

It is contemplated that multiple signals for multiple purposes may be accomplished through this system by adding a keyboard to IC13 and maintaining a constant supply of power thereto. This would permit multiple tone generations, each pair of tones accomplishing a given act.

What we claim is:

1. In a radio signal device, a transmitter for transmitting a dual tone multi frequency signal through standard radio equipment, a decoder for receiving said signal and closing a switch in a remote location to effect the actuation of a control switch to light an airfield said device consists of a pair of modules, one mounted in the aircraft and the other mounted in the air field control tower, the first mentioned module having means for manually activating one set of contacts which directs a circuit therethrough at a predetermined voltage to a tone generator, another set of contacts also actuated by said switch which transfers the input from the aircraft microphone and connects it to the output of the tone generator and which actuates still another set of contacts to key the transmitter so the tones will be broadcast to the second module which will receive the signal and direct same to four stages of programmable level adjustments, the first two stages being attenuators and the second two stages being amplifiers, directing the output through active filters, resistors and capacitors, to produce an output of sine waves, which will be converted to square waves and amplified to TTL compatible levels and into a decoder, the signal is then verified and sets a latch, which it then conducts and energizes to activate a contactor which turns on the lights at the airport.

2. In a radio signal device, a transmitter for transmitting a dual tone multi frequency signal, a decoder for receiving said signal and closing a switch to energize a preselected work, said transmitter being connectable into the transceiver of an aircraft in the socket provided for the microphone connection, and the microphone is then connected into the transmitter in a socket provided therefor, a switch on said transmitter for activating the transmitter in lieu of the regular radio transmitter, said switch directing a circuit of electrical energy to a tone generator through a resistor and diode, and transmits tones generated by said generator, a transceiver for the receipt of said signal, which is set into four stages of programable level adjustment having attenuators and amplifiers, low pass and high pass filters whose output are sine waves, means for converting said sine waves to square waves, a decoder for receiving said square waves and detecting valid signal input, providing a battery diget and a strobe signal to further verify the input, a latch set by said verification sending a high output to a transistor to conduct and to a relay to energize a contactor which activates the light switch at the air field.

* * * * *